US008804053B2

(12) United States Patent
Kim

(10) Patent No.: US 8,804,053 B2
(45) Date of Patent: Aug. 12, 2014

(54) DISPLAY APPARATUS, DISPLAY SYSTEM, AND METHOD FOR DISPLAYING IMAGE THEREOF

(75) Inventor: Jeong-geun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 13/454,521

(22) Filed: Apr. 24, 2012

(65) Prior Publication Data

US 2012/0307125 A1 Dec. 6, 2012

(30) Foreign Application Priority Data

Jun. 2, 2011 (KR) ........................ 10-2011-0053287

(51) Int. Cl.

| | |
|---|---|
| ***H04N 5/64*** | (2006.01) |
| ***H04N 9/31*** | (2006.01) |
| ***H04N 5/14*** | (2006.01) |
| ***H04N 9/64*** | (2006.01) |
| ***G03B 21/22*** | (2006.01) |
| ***G03B 21/26*** | (2006.01) |

(52) U.S. Cl.

USPC .......... 348/744; 348/571; 348/333.1; 353/71; 353/30

(58) Field of Classification Search

None

See application file for complete search history.

(56) References Cited

U.S. PATENT DOCUMENTS

| | | | | |
|---|---|---|---|---|
| 2005/0225729 | A1* | 10/2005 | Kobayashi | 353/30 |
| 2005/0248729 | A1* | 11/2005 | Drucker et al. | 353/71 |
| 2008/0136973 | A1* | 6/2008 | Park | 348/744 |
| 2009/0096994 | A1* | 4/2009 | Smits | 353/30 |
| 2010/0002151 | A1* | 1/2010 | Pan | 348/744 |
| 2011/0170746 | A1* | 7/2011 | Pryor | 382/103 |

* cited by examiner

*Primary Examiner* — Jefferey Harold
*Assistant Examiner* — Sean Haiem
(74) *Attorney, Agent, or Firm* — Sughrue Mion, PLLC

(57) ABSTRACT

A display apparatus, display system, and method for displaying images thereof are provided. The display apparatus includes an image receiving unit which is configured to receive an image signal; an image processing unit which is configured to divide the image signal into a main image signal and an additional image signal and to process the main image signal and the additional image signal; a display unit which is configured to display the processed image signals; an image projection unit which is configured to project the processed image signals; and a control unit which controls to provide the processed main image signal to the display unit and the processed additional image signal to the image projection unit.

28 Claims, 9 Drawing Sheets

100
200
10
+
100
110 IMAGE RECEIVING UNIT
120 IMAGE PROCESSING UNIT
DISPLAY UNIT 130
IMAGE PROJECTION UNIT 140
CONTROL UNIT
150

DISPLAY APPARATUS, DISPLAY SYSTEM, AND METHOD FOR DISPLAYING IMAGE THEREOF

CROSS-REFERENCE TO RELATED APPLICATIONS

This application claims priority from Korean Patent Application No. 10-2011-00053287, filed in the Korean Intellectual Property Office on Jun. 2, 2011, the disclosure of which is incorporated herein by reference.

BACKGROUND

1. Field

Methods and apparatuses consistent with exemplary embodiments herein relate to a display apparatus, a display system, and a method for displaying an image thereof, and more particularly, to a display apparatus having an image projection function, a display system, and a method for displaying an image thereof.

2. Description of the Related Art

Recently, various electronic apparatuses including a display apparatus have been developed significantly.

In particular, a digital television (TV) receiving a broadcast signal performs various functions including providing Internet access. Accordingly, a user may download content via Internet on real-time basis and check news, whether, or e-mails on a TV screen.

Therefore, additional information to be displayed on a single TV screen has increased continuously.

If such additional information is periodically displayed on a screen where a main image is displayed, a user may experience difficulty in concentrating on a program currently being displayed.

SUMMARY

An aspect of the exemplary embodiments relates to a display apparatus which projects an additional image signal on a projection area outside of a display screen using a projector, a display system, and a method for displaying an image thereof.

According to an aspect of an exemplary embodiment, there is provided a display apparatus which may include: an image receiving unit which is configured to receive an image signal; an image processing unit which is configured to divide the image signal into a main image signal and an additional image signal and to process the main image signal and the additional image signal; a display unit which is configured to display the processed image signals; an image projection unit which is configured to project the processed image signals; and a control unit which controls to provide the processed main image signal to the display unit and the processed additional image signal to the image projection unit.

The image projection unit may include a plurality of projectors configured to project a plurality of image signals.

The image projection unit may be configured to project the processed additional image signal on at least one projection area from among a cradle of the display apparatus, a rear wall surface of the display apparatus, an upper surface of the display apparatus and a lower surface of the display apparatus.

The additional image signal may be at least one of an on-screen display image signal and an Internet image signal.

According to an aspect of an exemplary embodiment, there is provided a display apparatus which may include: an image receiving unit which receives an image signal; an image processing unit which divides the image signal into a main image signal and an additional image signal and processes the divided image signals; a display unit which is configured to display the processed image signals; a communication unit which is configured to transmit the processed image signals to an external projector; and a control unit which controls the display unit to display the processed main image signal and controls the communication unit to transmit the additional image signal to the external projector.

The communication unit may include a plurality of output ports configured to provide a plurality of image signals to a plurality of projectors.

The external projector may project the additional image signal on at least one projection area from among a cradle of the display apparatus, a rear surface of the display apparatus, an upper surface of the display apparatus and a lower surface of the display apparatus.

According to an aspect of an exemplary embodiment, there is provided an image system which may include: a display apparatus which is configured to divide a received image signal into a main image signal and an additional image signal, display the main image signal and output the additional image signal; and a projector which receives the additional image signal output from the display apparatus and projects the received additional image signal.

The display apparatus may include a plurality of output ports configured to provide a plurality of image signals to a plurality of projectors.

The projector may be configured to project the additional image signal on at least one projection area from among a cradle of the display apparatus, a rear surface of the display apparatus, an upper surface of the display apparatus and a lower surface of the display apparatus.

According to an aspect of an exemplary embodiment, there is provided a method for displaying an image in a display apparatus, wherein the method may include: receiving an image signal; dividing the received image signal into a main image signal and an additional image signal; processing the main image signal and the additional image signal; displaying the processed main image; and projecting the processed additional image signal.

The projecting may include projecting a plurality of image signals.

The projecting may include projecting the processed additional image signal on at least one projection area from among a cradle of the display apparatus, a rear surface of the display apparatus, an upper surface of the display apparatus and a lower surface of the display apparatus.

The additional image signal may be at least one of an on-screen display image signal and an Internet image signal.

According to an aspect of an exemplary embodiment, there is provided a method for displaying an image in a display apparatus, wherein the method may include: receiving an image signal; dividing the received image signal into a main image signal and an additional image signal; processing the divided image signals; displaying the main image signal; and outputting the additional image signal to a projector.

The outputting of the additional image signal may include providing a plurality of additional image signals to a plurality of projectors.

The projector may be disposed to project the additional image signal on at least one projection area from among a cradle of the display apparatus, a rear surface of the display apparatus, an upper surface of the display apparatus and a lower surface of the display apparatus.

According to an aspect of an exemplary embodiment, there is provided a method for displaying an image in an image system which includes a display apparatus and a projector, wherein the method may include: dividing a received image signal into a main image signal and an additional image signal; displaying the main image signal; providing the additional image signal to the projector according to a predetermined event at the display apparatus; and receiving the additional image signal from the display apparatus and projecting the received additional image signal at the projector.

The providing may include providing a plurality of additional image signals to a plurality of projectors.

The projector may be disposed to project the additional image signal on at least one projection area from among a cradle of the display apparatus, a rear surface of the display apparatus, an upper surface of the display apparatus and a lower surface of the display apparatus.

According to an aspect of an exemplary embodiment, there is provided a display apparatus comprising: an image processing unit configured to divide an image signal into a main image signal and an additional image signal and to process the main image signal and the additional image signal; a display unit configured to display the processed image signals; an image projection unit configured to project the processed image signals; and a control unit configured to control the display unit to display the processed main image signal to and to control the image projection unit to project the processed additional image signal.

The display apparatus may further include a projection screen area, wherein the control unit is configured to control the image projection unit to project the processed additional image signal onto the projection screen area.

The display apparatus may further include a location sensing unit which senses a location of a user, wherein the control unit is further configured control a projection direction of the image projection unit according to the location of the user sensed by the location sensing unit.

BRIEF DESCRIPTION OF THE DRAWINGS

The above and/or other aspects of the present inventive concept will be more apparent by describing exemplary embodiments with reference to the accompanying drawings, in which.

DETAILED DESCRIPTION

Figure 1A:
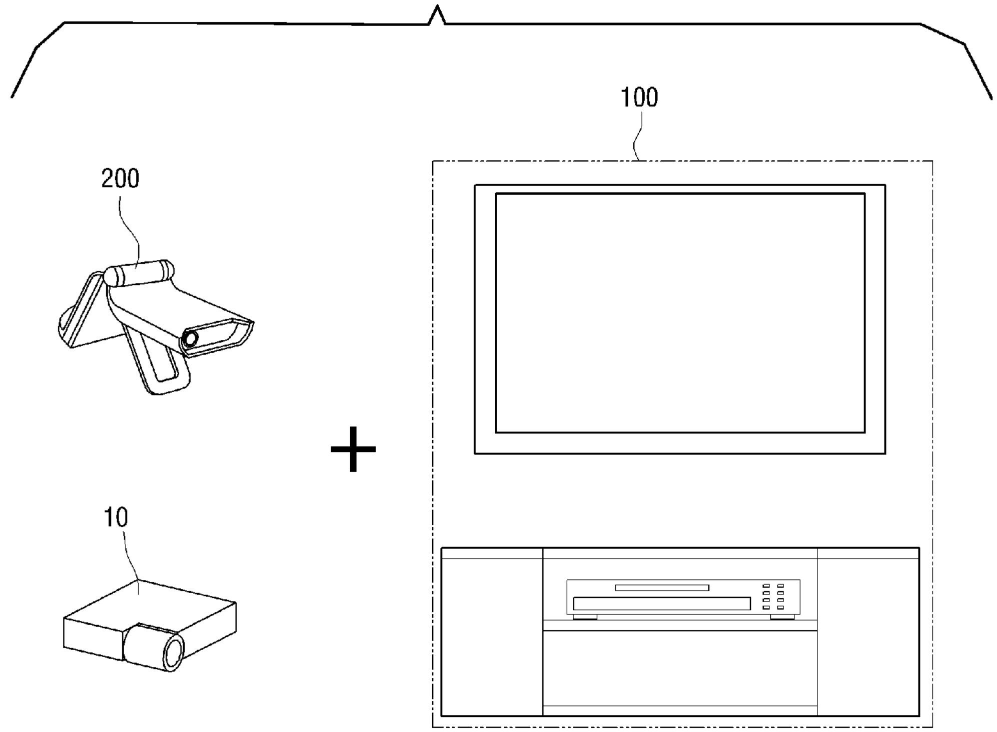
FIG. 1A is a schematic view illustrating a configuration of an image system according to an exemplary embodiment.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they might obscure the application with unnecessary detail.

FIG. 1 is a schematic view illustrating a configuration of an image system according to an exemplary embodiment.

According to FIG. 1A, the image system includes a display apparatus 100 and an image projector (or projector) 200, 10 capable of projecting an image on a predetermined projection area and may be embodied in various forms.

The display apparatus 100 may be embodied in various forms. Mainly, the display apparatus 100 may be embodied as a digital TV. In some cases, the display apparatus 100 may be embodied as various display apparatus such as a desk-top computer, a notebook computer, a digital broadcast terminal, or a navigation which receives an image signal from outside and displays the received image signal. Hereinafter, the display apparatus 100 will be regarded as a digital TV for convenience of explanation.

In particular, the display apparatus 100 may be embodied to have at least one projector 10 within or transmit an image signal to at least one external projector 200.

The projector 200, 10 may project an image on a predetermined projection area by projecting a light representing the image. For example, the projector 200, 10 may be embodied as a small-scale light emitting diode (LED) projector.

In particular, the projector 200, 10 may be built in the display apparatus 100 (10) or provided as a separate apparatus outside of the display apparatus 100 (300) to project an image signal that the display apparatus 100 receives on a predetermined projection area.

The display apparatus 10 displays an image output signal projected by the image projection apparatus 100. The display apparatus 200 may be embodied as various display panels such as liquid crystal display (LCD), digital light processing (DLP) and liquid crystal on silicon (LCOS).

While not illustrated in the drawings, a remote controller (not shown) capable of controlling the above-mentioned image projection function may be further included.

The remote controller (not shown) receives a user's command to project an additional image signal from among image signals that a display apparatus receives on a predetermined projection area through the projector 200, 10.

In particular, the remote controller (not shown) may include an input button which receives a user's command to perform the above-mentioned projection function. In addition, the remote controller (not shown) may include a selection button to select at least one projector from among a plurality of internal or external projectors.

Figure 1B:
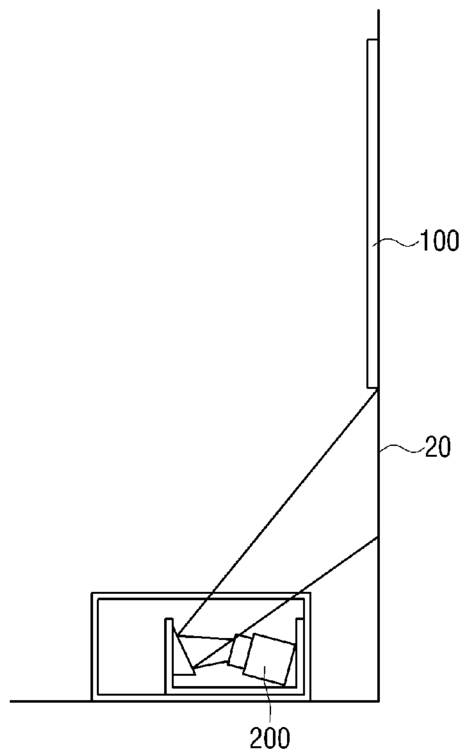
FIG. 1B is a view illustrating an embodiment form of an image system according to an exemplary embodiment.

FIG. 1B is a view illustrating an exemplary embodiment form of an image system according to an exemplary embodiment.

According to FIG. 1B, an image system comprises the display apparatus 100 and the external projector 200, and the external projector 200 may be disposed such that a cradle of the display apparatus 100 becomes the projection area 20. However, the configuration illustrated in FIG. 1B is only an example to explain an exemplary embodiment form of an image system. The external projector 200 may be disposed at various locations having various projection areas and may also use the internal projector 10 in the display apparatus 100. The detailed description regarding this will be provided later.

Figure 2A:
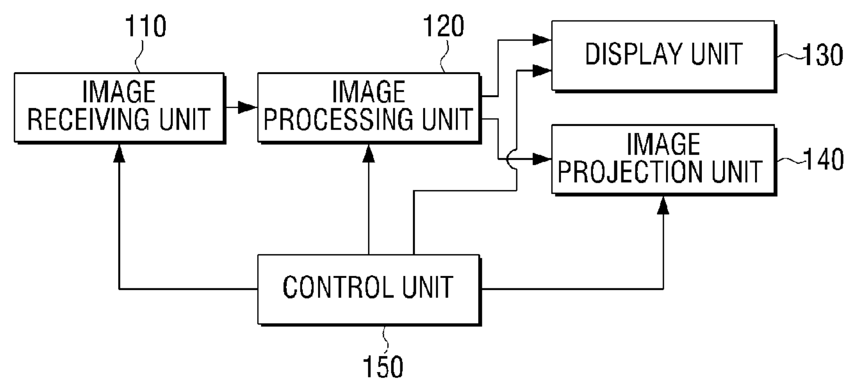
FIG. 2A is a block diagram illustrating a configuration of a display apparatus according to an exemplary embodiment.

FIG. 2A is a block diagram illustrating a configuration of a display apparatus according to an exemplary embodiment.

According to FIG. 2A, the display apparatus 100 comprises an image receiving unit 110, an image processing unit 120, a display unit 130, a projection unit 140, and a control unit 150.

The image receiving unit 110 receives various image signals from outside. For example, the image receiving unit 110 receives an image signal from a broadcasting station or a satellite via wire or wirelessly and demodulates the received image signal. In addition, the image receiving unit 110 may be connected to an external apparatus such as PC, camera, and DVD and receives an image from the external apparatus. The external apparatus may be connected wirelessly or via cable through interface such as S-Video, Component, Composite, D-Sub, Digital-visual interface (DVI), High-Definition Multimedia Interface (HDMI), and so on.

The image processing unit 120 processes an image signal received through the image receiving unit 110.

In particular, the image processing unit 120 may divide an input image signal into a main image signal and an additional image signal and perform image-processing. Herein, the main image signal represents an image mainly viewed by a user, such as a broadcast signal and a Digital Versatile Disc (DVD) signal, and the additional image signal represents an Internet cast image signal, a Really Simple Syndication (RSS) signal, and information regarding on-screen display (OSD) and the state of an apparatus. In some cases, the additional image signal represents information provided by the display apparatus 100 (for example, information on the state of an apparatus) rather than an image signal received from outside. Hereinafter, a case where an additional image signal is separated from an image signal received from outside will be explained for convenience of explanation.

In addition, the image processing unit 120 may include a scaler (not shown) which converts an input image signal into a display size and a display resolution and a display driver unit (not shown) which converts the converted image signal into various signal formats according to the type of a display panel.

The display unit 130 may display a main image signal which is separated from the image processing unit 120 and processed thereafter. Herein, the display unit 110 may be embodied in at least one form of a liquid crystal display, a thin film transistor-liquid crystal display, an organic light-emitting diode, a flexible display, and a 3D display.

The image projection unit 140 projects an additional image signal which is signal-processed by the image processing unit 120 on a predetermined projection area (not shown).

Herein, the image projection unit 140 may be embodied to include a light source, a transmissible display apparatus, and a projection lens.

Specifically, the image projection unit 140 may be disposed to project an additional image signal on at least one projection area from among a cradle of the display apparatus 100, a rear wall surface of the display apparatus 100, an upper surface of the display apparatus 100 and a lower surface of the display apparatus 100.

In addition, the image projection unit 140 may be embodied to include a plurality of projectors to project a plurality of additional image signals on a different projection area.

The control unit 150 may control overall operations of each of the above-mentioned units. Specifically, the control unit 150 may control to provide a main image signal from among image signals processed by the image processing unit 120 to the display unit 130 and an additional image signal from among image signals processed by the image processing unit 120 to the image projection unit 140 according to a predetermined event. For example, if a user connects to an internet site while watching a channel broadcast, a screen of the internet site connected may be provided to the image projection unit 140 to be projected on a predetermined projection area.

Herein, the predetermined event may be a user's command input through an external input apparatus such as a remote controller and, in some cases, the corresponding projection function may be set as default at the time of manufacturing.

Meanwhile, the display apparatus 100 may further include a location sensing unit (not shown) which senses a user's location.

In this case, the control unit 150 may control a projection direction of the image projection unit 140 according to a user's location sensed by the location sensing unit (not shown).

Specifically, the control unit 150 may control a projection direction of the image projection unit 140 according to a user's location so that an image may be projected at a location where the user may watch the image. For example, the location sensing unit (not shown) may be embodied as a Pyroelectric InfraRed (PIR) sensor to sense a movement of a subject having body temperature and thus, may prevent an operation error resulting from confusion a human being with other objects.

The display apparatus 100 may further include a user interface unit (not shown) receiving a user's command input through an external input apparatus such as a remote controller.

Meanwhile, the projector 140 is built in the display apparatus 100 in FIG. 2A, but this is only an example. According to another exemplary embodiment, a projector may be provided as a separate apparatus from the display apparatus 100, which will be explained with reference to FIG. 2B.

Figure 2B:
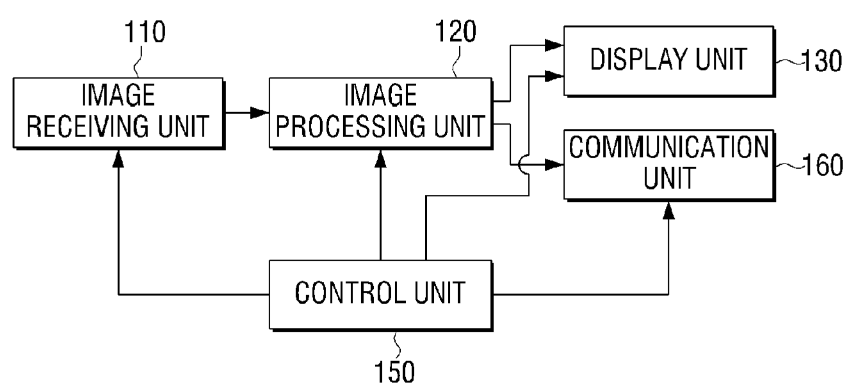
FIG. 2B is a block diagram illustrating a configuration of a display apparatus according to another exemplary embodiment.

FIG. 2B is a block diagram illustrating a configuration of a display apparatus according to another exemplary embodiment.

According to FIG. 2B, the display apparatus 100 comprises the image receiving unit 110, the image processing unit 120, the display unit 130, the communication unit 140, and the control unit 150.

The components in FIG. 2A which are overlapped with the components in FIG. 2B will not be explained in detail.

The image receiving unit 110 receives various image signals from outside.

The image processing unit 120 performs signal-processing with respect to an image signal received through the image receiving unit 110.

In particular, the image processing unit 120 may divide an input image signal into a main image signal and an additional image signal and process the divided signals. Herein, the main image signal represents an image mainly viewed by a user, such as a broadcast signal and a DVD signal and the additional image signal represents information regarding the state of an apparatus, such as an Internet cast signal, an RSS signal, and information regarding OSD and the state of an apparatus.

In some cases, the additional image signal represents information provided by the display apparatus 100 (for example, information on the state of an apparatus) rather than an image signal received from outside. Hereinafter, a case where an additional image signal is separated from an image signal received from outside will be explained for convenience of explanation.

The display unit 130 may display a main image signal which is separated from the image processing unit 120 and processed thereafter.

The communication unit 140 communicates with an external projector (not shown) and transmits an image signal processed by the image processing unit 120. Herein, the communication unit 140 may be embodied to communicate with an external projector (not shown) via a Local Area Network (LAN) or an Internet network, or using a Universal Serial Bus (USB) port and wireless communication method. For example, the communication unit 140 may communicate with an external projector (not shown) according to various wired and wireless communication technology such as Wireless Fidelity (WI-FI), Internet, LAN, Ethernet, TCP/IP, IPX, FireWire, IEEE 1394, Think, CDMA, TDMA, BlueTooth (BT), High Definition Multimedia Interface (HDMI-CEC), Wireless HDMI-CEC, and Radio Frequency (RF).

In addition, the image projection unit (not shown) may be disposed to project an additional image signal on at least one projection area from among a cradle of the display apparatus 100, a rear wall surface of the display apparatus 100, an upper surface of the display apparatus 100 and a lower surface of the display apparatus 100.

In addition, the image projection unit 140 may be embodied to include a plurality of output ports to provide a plurality of additional image signals to a plurality of projectors which are disposed to project a plurality of additional image signals processed by the image processing unit 120 on a different projection area.

The control unit 150 may control overall operations of each of the above-mentioned function units. Specifically, the control unit 150 may control to provide a main image signal from among image signals processed by the image processing unit 120 to the display unit 130 and an additional image signal from among image signals processed by the image processing unit 120 to the communication unit 140 according to a predetermined event. For example, if a user connects to an internet site while watching a channel broadcast, a screen of the internet site connected may be provided to the communication unit 140.

Herein, the predetermined event may be a user's command input through an external input apparatus such as a remote controller and, in some cases, the corresponding projection function may be set as default at the time of manufacturing.

While not illustrated in FIGS. 2A and 2B, a reflecting plate or a structure may be provided further to secure a projection angle and a projection distance.

Figure 3A:
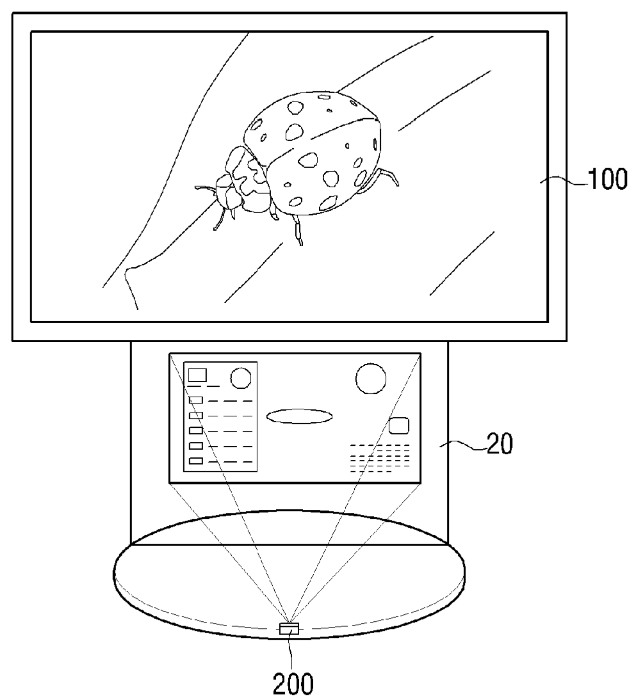
FIGS. 3A and 3B are views to explain a display state according to an exemplary embodiment.
Figure 3B:
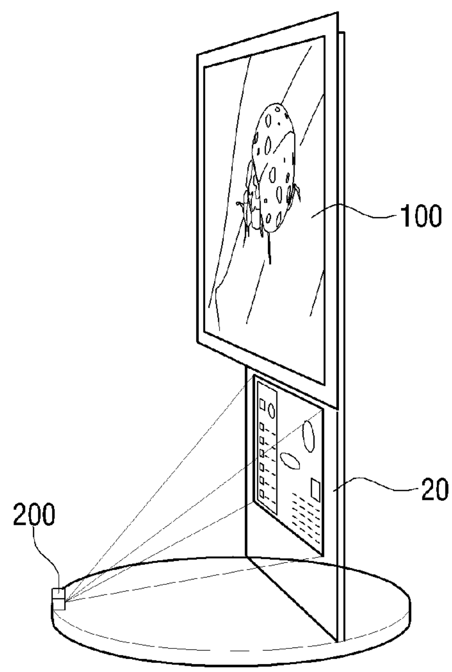

FIGS. 3A and 3B are views to explain a display state according to an exemplary embodiment.

According to FIG. 3A, an additional image signal may be embodied to be projected on a lower portion of the display apparatus 100 (for example, a cradle where glasses might be stored, or more generally, an area attached to a front of the display apparatus 100). In this case, the projector 200 may be disposed on a front lower portion of the cradle so that the additional image signal may be projected on the corresponding projection area 20.

FIG. 3B is a view of the exemplary embodiment of FIG. 3A which is viewed from a side.

Figure 4A:
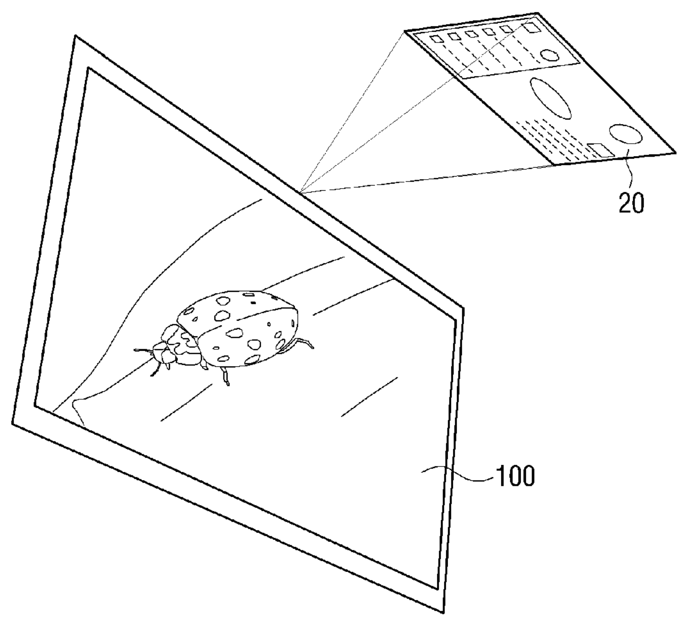
FIGS. 4A, 4B, and 4C are views to explain a display state according to an exemplary embodiment.
Figure 4B:
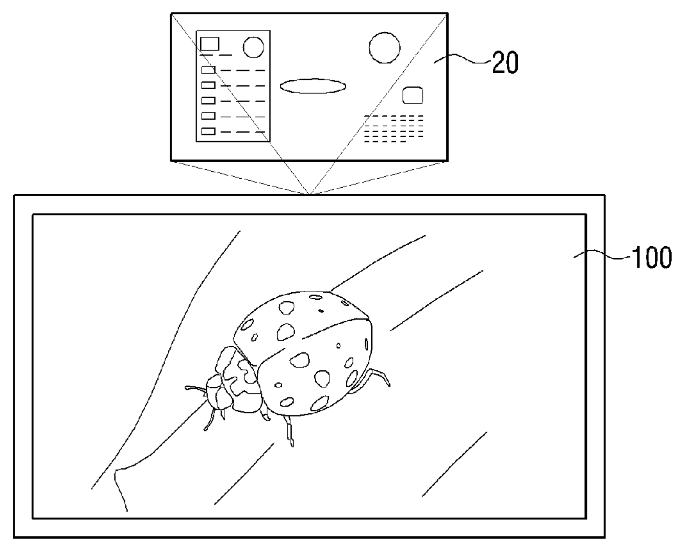

FIGS. 4A and 4B are views to explain a display state according to an exemplary embodiment.

According to FIG. 4A, an additional image signal may be embodied to be projected on a projection area of an upper side of the display apparatus 100 (for example, on a ceiling 20). In this case, the projector 200 may be disposed on the uppermost portion of the display apparatus 100 internally or externally so that the additional image signal may be projected on the corresponding projection area 20.

According to FIG. 4B, an additional image signal may be embodied to be projected on projection area of a rear side of the display apparatus 100 (for example, on a wall surface 20). In this case, the projector 200 may be disposed on a rear portion of the display apparatus 100 internally or externally so that the additional image signal may be projected on the corresponding projection area 20.

Figure 4C:
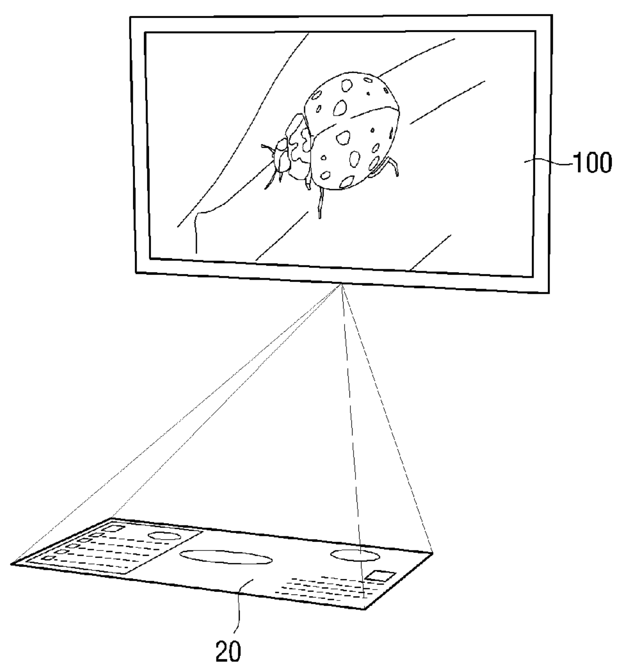

According to FIG. 4C, an additional image signal may be embodied to be projected on projection area of a lower side of the display apparatus 100 (for example, on a floor 20). In this case, the projector 200 may be disposed on the lowermost portion of the display apparatus 100 internally or externally so that the additional image signal may be projected on the corresponding projection area 20.

In the above exemplary embodiments in FIGS. 3A, 3B, and 4A to 4C, the location of a projector to project the additional image signal on each projection area is specified, but this is only for convenience of explanation. The projector may not be disposed on the above-specified area to projector an image on a certain projection area.

Figure 5:
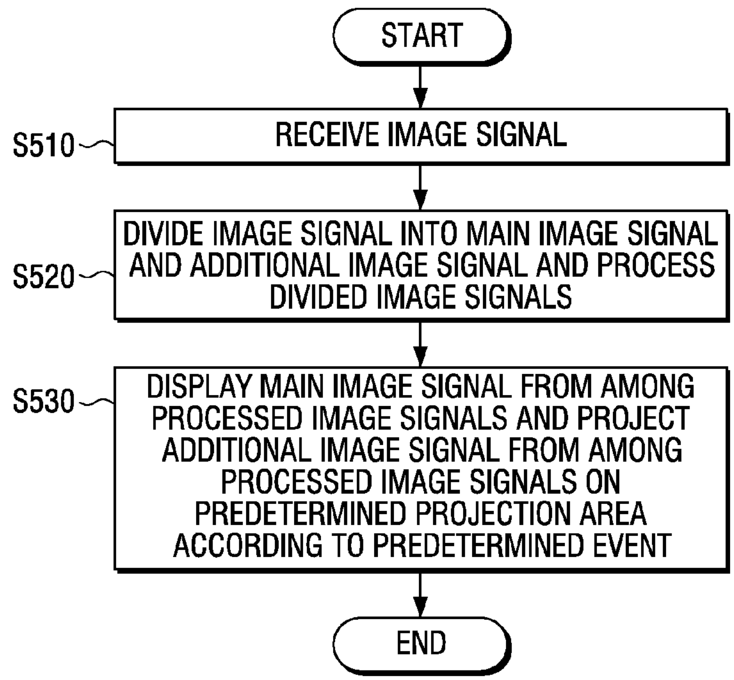
FIG. 5 is a flowchart to explain a method for displaying an image according to an exemplary embodiment.

FIG. 5 is a flowchart to explain a method for displaying an image according to an exemplary embodiment.

According to the image displaying method illustrated in FIG. 5, if an image signal is received (S510), the received image signal is divided into a main image signal and an additional image signal and then processed (S520).

Subsequently, the main image signal from among the image signals processed in S520 is displayed on a screen and the additional image signal is projected on a predetermined projection area according to a predetermined event (S530). Herein, the additional image signal may be at least one of an OSD image signal and an Internet image signal.

In this case, the additional image signal may be projected on at least one projection area from among a cradle of the display apparatus, a rear wall surface of the display apparatus, an upper surface of the display apparatus and a lower surface of the display apparatus.

In addition, if there are a plurality of additional image signals, the additional image signals may be projected on a different projection area.

Figure 6:
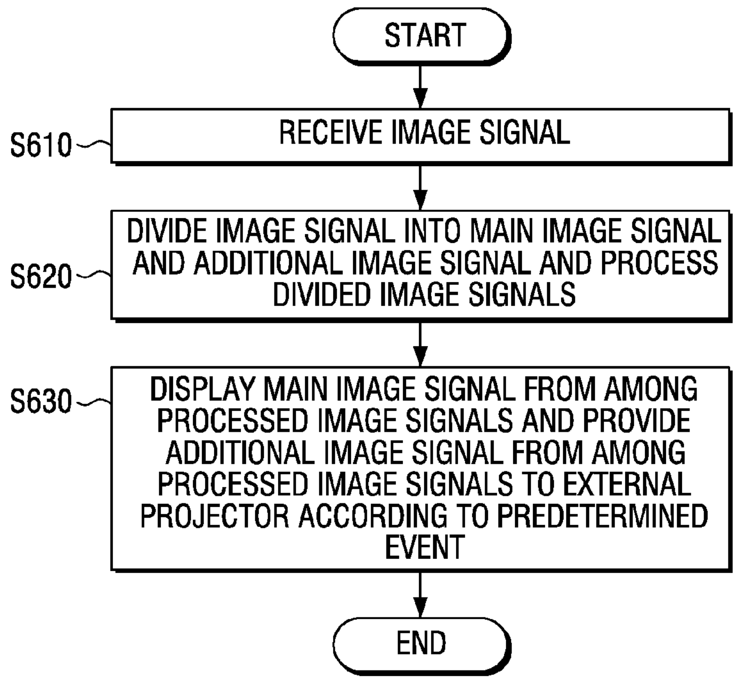
FIG. 6 is a flowchart to explain a method for displaying an image according to another exemplary embodiment.

FIG. 6 is a flowchart to explain a method for displaying an image according to another exemplary embodiment.

According to the image displaying method illustrated in FIG. 6, if an image signal is received (S610), the received image signal is divided into a main image signal and an additional image signal and then processed (S620).

Subsequently, the main image signal from among the image signals processed in S620 is displayed on a screen and the additional image signal is provided to an external projector (S630). Herein, the additional image signal may be at least one of an OSD image signal and an Internet image signal.

In this case, the external projector may be disposed such that the additional image signal may be projected on at least one projection area from among a cradle of the display apparatus, a rear wall surface of the display apparatus, an upper surface of the display apparatus and a lower surface of the display apparatus.

In S630, if there are a plurality of additional image signals, the additional image signals may be provided to each of a plurality of projectors which are disposed to project the additional image signals on a different area.

Therefore, there is no need to display additional information on a TV screen and thus, a user may concentrate on a screen. In addition, a display burning problem due to the additional information may be resolved.

Another exemplary embodiment may include a computer reading and recording medium having a program for performing the image displaying method of a display apparatus and a display system. The computer reading and recording medium includes all kinds of recording apparatuses which store data readable by a computer system. The examples of the computer reading and recording medium include a ROM, a RAM, a CD-ROM, a magnetic tape, a floppy disk, and an optical data storing apparatus. The computer reading and recording medium is distributed to a computer system connected through a network, and a code readable by a computer through a distribution method may be stored and performed.

Another exemplary embodiment may include a computer reading and recording medium having a program for performing the above method for display an image. The computer reading and recording medium includes all kinds of recording apparatuses which store data readable by a computer system. Examples of the computer reading and recording medium include a ROM, a RAM, a CD-ROM, a magnetic tape, a floppy disk, and an optical data storing apparatus. The computer reading and recording medium may be distributed to a computer system connected through a network, and a code readable by a computer through a distribution method may be stored and performed.

Although a few exemplary embodiments have been shown and described, it would be appreciated by those skilled in the art that changes may be made without departing from the principles and spirit of the inventive concept, the scope of which is defined in the claims and their equivalents.

What is claimed is:

1. A display apparatus comprising:

an image receiving unit which is configured to receive an image signal from a single source;

an image processing unit which is configured to divide the received image signal into a main image signal which represents an image mainly viewed by a user and an additional image signal related to the main image signal or the display apparatus which displays the main image signal and to process the main image signal and the additional image signal;

a display unit which is configured to display the processed image signals;

an image projection unit which is configured to project the processed image signals; and a control unit which is configured to control the display unit to display the processed main image signal and to control the image projection unit to project the processed additional image signal.

2. The display apparatus as claimed in claim 1, wherein the image projection unit comprises a plurality of projectors configured to project a plurality of image signals.

3. The display apparatus as claimed in claim 1, wherein the image projection unit is configured to project the processed additional image signal on at least one projection area from among a cradle of the display apparatus, a rear wall surface of the display apparatus, an upper surface of the display apparatus and a lower surface of the display apparatus.

4. The display apparatus as claimed in claim 1, wherein the additional image signal is at least one of an on-screen display image signal and an Internet image signal.

5. A display apparatus comprising:

an image receiving unit which is configured to receive an image signal from a single source;

an image processing unit which is configured to divide the received image signal into a main image signal which represents an image mainly viewed by a user and an additional image signal related to the main image signal or the display apparatus which displays the main image signal and to process the main image signal and the additional image signal;

a display unit which is configured to display the processed image signals;

a communication unit which is configured to transmit the processed image signals to an external projector; and a control unit which controls the display unit to display the processed main image signal and controls the communication unit to transmit the additional image signal to the external projector.

6. The display apparatus as claimed in claim 5, wherein the communication unit comprises a plurality of output ports configured to provide a plurality of image signals to a plurality of projectors.

7. The display apparatus as claimed in claim 5, wherein the external projector projects the additional image signal on at least one projection area from among a cradle of the display apparatus, a rear surface of the display apparatus, an upper surface of the display apparatus and a lower surface of the display apparatus.

8. An image system comprising:

a display apparatus which is configured to divide an image signal received from a single source into a main image signal which represents an image mainly viewed by a user and an additional image signal related to the main image signal or the display apparatus which displays the main image signal, display the main image signal and output the additional image signal; and a projector which receives the additional image signal output from the display apparatus and projects the received additional image signal.

9. The image system as claimed in claim 8, wherein the display apparatus comprises a plurality of output ports configured to provide a plurality of image signals to a plurality of projectors.

10. The image system as claimed in claim 8, wherein the projector is configured to project the additional image signal on at least one projection area from among a cradle of the display apparatus, a rear surface of the display apparatus, an upper surface of the display apparatus and a lower surface of the display apparatus.

11. A method for displaying an image in a display apparatus, the method comprising:

receiving an image signal from a single source;

dividing the received image signal into a main image signal which represents an image mainly viewed by a user and an additional image signal related to the main image signal or the display apparatus which displays the main image signal;

processing the main image signal and the additional image signal;

displaying the processed main image; and projecting the processed additional image signal.

12. The method as claimed in claim 11, wherein the projecting comprises projecting a plurality of image signals.

13. The method as claimed in claim 11, wherein the projecting comprises projecting the processed additional image signal on at least one projection area from among a cradle of the display apparatus, a rear surface of the display apparatus, an upper surface of the display apparatus and a lower surface of the display apparatus.

14. The method as claimed in claim 11, wherein the additional image signal is at least one of an on-screen display image signal and an Internet image signal.

15. A method for displaying an image in a display apparatus, the method comprising:

receiving an image signal from a single source;

dividing the received image signal into a main image signal which represents an image mainly viewed by a user and an additional image signal related to the main image signal or the display apparatus which displays the main image signal;

processing the main image signal and the additional image signal;

displaying the main image signal; and outputting the additional image signal to a projector.

16. The method as claimed in claim 15, wherein the outputting of the additional image signal comprises providing a plurality of additional image signals to a plurality of projectors.

17. The method as claimed in claim 15, wherein the projector is disposed to project the additional image signal on at least one projection area from among a cradle of the display apparatus, a rear surface of the display apparatus, an upper surface of the display apparatus and a lower surface of the display apparatus.

18. A method for displaying an image in an image system which includes a display apparatus and a projector, the method comprising:

dividing an image signal received from a single source into a main image signal which represents an image mainly viewed by a user and an additional image signal related to the main image signal or the display apparatus which displays the main image signal;

displaying the main image signal;

providing the additional image signal to the projector according to a predetermined event at the display apparatus; and receiving the additional image signal from the display apparatus and projecting the received additional image signal at the projector.

19. The method as claimed in claim 18, wherein the providing comprises providing a plurality of additional image signals to a plurality of projectors.

20. The method as claimed in claim 18, wherein the projector is disposed to project the additional image signal on at least one projection area from among a cradle of the display apparatus, a rear surface of the display apparatus, an upper surface of the display apparatus and a lower surface of the display apparatus.

21. A display apparatus comprising:

an image processing unit configured to divide an image signal received from a single source into a main image signal which represents an image mainly viewed by a user and an additional image signal related to the main image signal or the display apparatus which displays the main image signal and to process the main image signal and the additional image signal;

a display unit configured to display the processed image signals;

an image projection unit configured to project the processed image signals; and a control unit configured to control the display unit to display the processed main image signal and to control the image projection unit to project the processed additional image signal.

22. The display apparatus as claimed in claim 21, further comprising a projection screen area, wherein the control unit is further configured to control the image projection unit to project the processed additional image signal onto the projection screen area.

23. The display apparatus as claimed in claim 21, further comprising a location sensing unit which senses a location of a user, wherein the control unit is further configured control a projection direction of the image projection unit according to the location of the user sensed by the location sensing unit.

24. The display apparatus as claimed in claim 1, wherein:

the single source comprises one of a broadcast station, a satellite, an external apparatus connected to the display apparatus, the main image signal is one of a broadcast signal and a Digital Versatile Disc signal, and the additional image signal is related to contents provided in the main image signal and comprises one of an Internet cast image signal, a Really Simple Syndication (RSS) signal, and a signal providing information regarding on-screen display (OSD) which provides information about contents of the main image signal, and the image processing unit converts the main image signal into a format suitable for the display unit and converts the additional image into a format suitable for the image projection unit such that overcrowding of a view by the display apparatus is prevented.

25. The display apparatus as claimed in claim 1, wherein the image processing unit comprises a scaler configured to convert the received image signal into a display size and a display resolution and a display driver unit configured to convert the converted image signal into various signal formats according to a type of a display panel.

26. The display apparatus as claimed in claim 1, wherein the main image signal is a broadcast signal or a Digital Versatile Disc (DVD) signal, and the additional image signal is an Internet cast image signal or a Really Simple Syndication (RSS) signal or information regarding on-screen display (OSD) or the state of an apparatus.

27. The display apparatus as claimed in claim 1, wherein the additional image signal is information provided by the display apparatus and wherein the additional image signal is about the main image signal.

28. The display apparatus as claimed in claim 1, wherein the image processing unit is further configured to divide the image signal into the main signal comprising broadcast content for display on the display unit and additional content information related to the broadcast content projected on the image projection unit.

* * * * *